US005545939A

United States Patent [19]

Cooper

[11] Patent Number: 5,545,939

[45] Date of Patent: Aug. 13, 1996

[54] WINDING END RESTRAINER FOR A ROTARY ELECTRICAL COMPONENT

[75] Inventor: John Cooper, Hemel Hempstead, United Kingdom

[73] Assignee: Lucas Industries plc., West Midlands, England

[21] Appl. No.: 166,542

[22] Filed: Dec. 14, 1993

[30] Foreign Application Priority Data

Dec. 19, 1992 [GB] United Kingdom .................. 9226497

[51] Int. Cl.$^6$ .................................................. H02K 3/46

[52] U.S. Cl. .......................................... 310/270; 310/71

[58] Field of Search ................................ 310/260, 270, 310/71, 91, 208, 45, 43

[56] References Cited

U.S. PATENT DOCUMENTS 4,139,789 2/1979 Hunt ....................................... 310/261

4,603,274 7/1986 Mosher ................................. 310/270

4,975,612 12/1990 Strobl ..................................... 310/71

5,191,248 3/1993 Huss ........................................ 310/71

5,258,682 11/1993 Ward et al. ........................... 310/270

FOREIGN PATENT DOCUMENTS 1496070 of 1977 United Kingdom .

*Primary Examiner*—R. Skudy

*Attorney, Agent, or Firm*—Jones & Askew

[57] ABSTRACT

A winding end restrainer for a rotary electrical component comprises a hollow body, location member for locating the body against rotation relative to the component and an insert locatable in the body so as to be non-rotatable relative thereto. Chambers are defined between the insert and the body for receiving respective sections of the winding ends. By preventing rotation of the hollow body and the insert relative to the rotary component, stresses which would otherwise be imparted to the winding ends are greatly reduced.

20 Claims, 7 Drawing Sheets

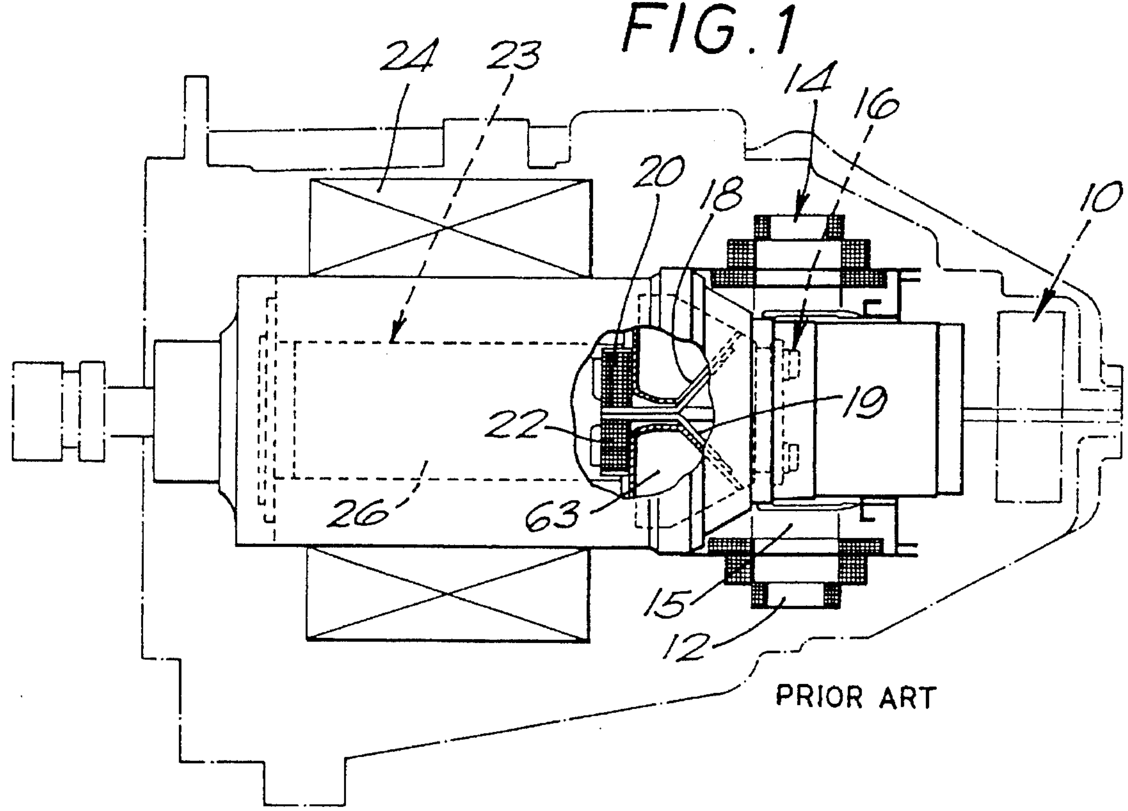
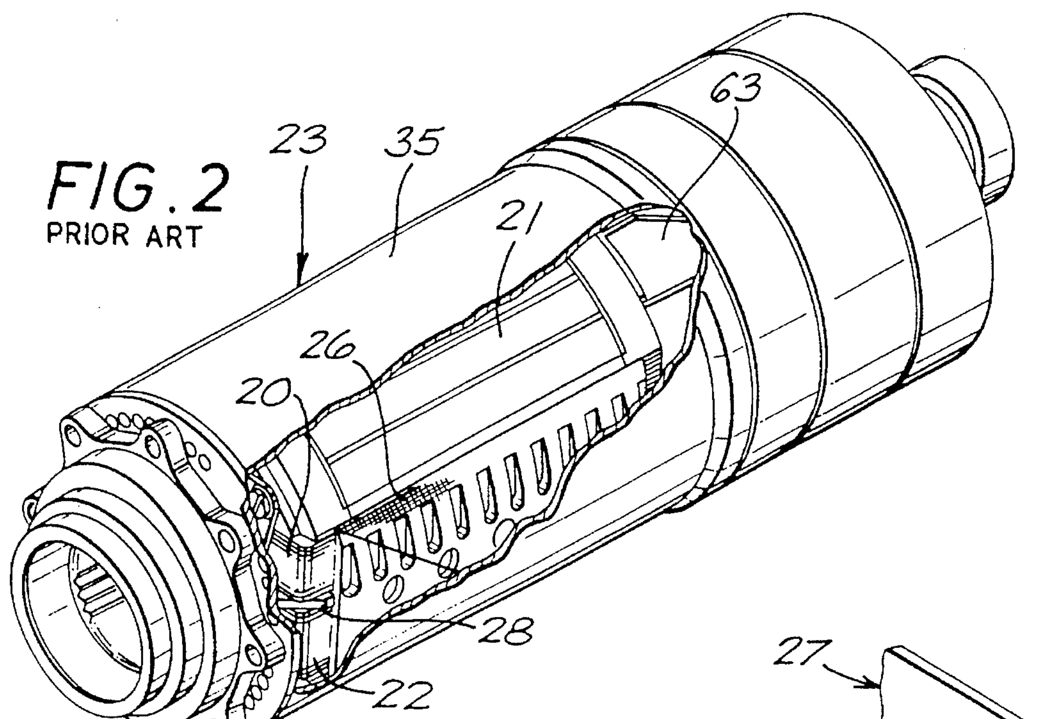
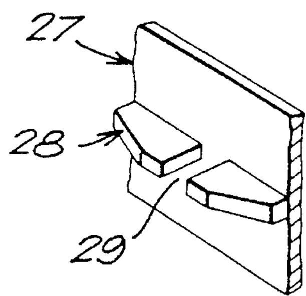
FIG. 3
PRIOR ART

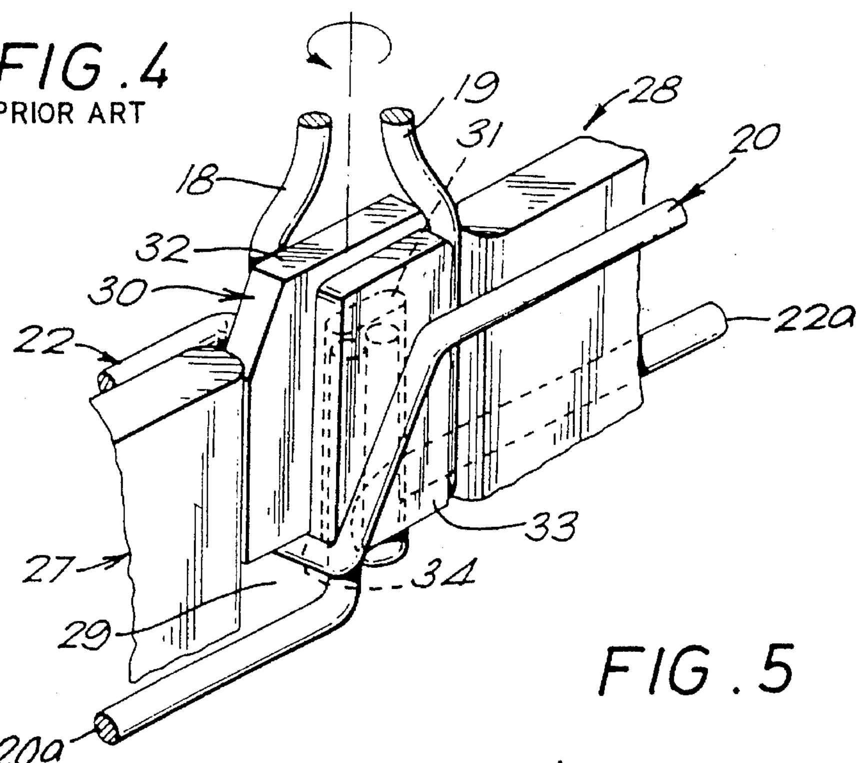
FIG.5
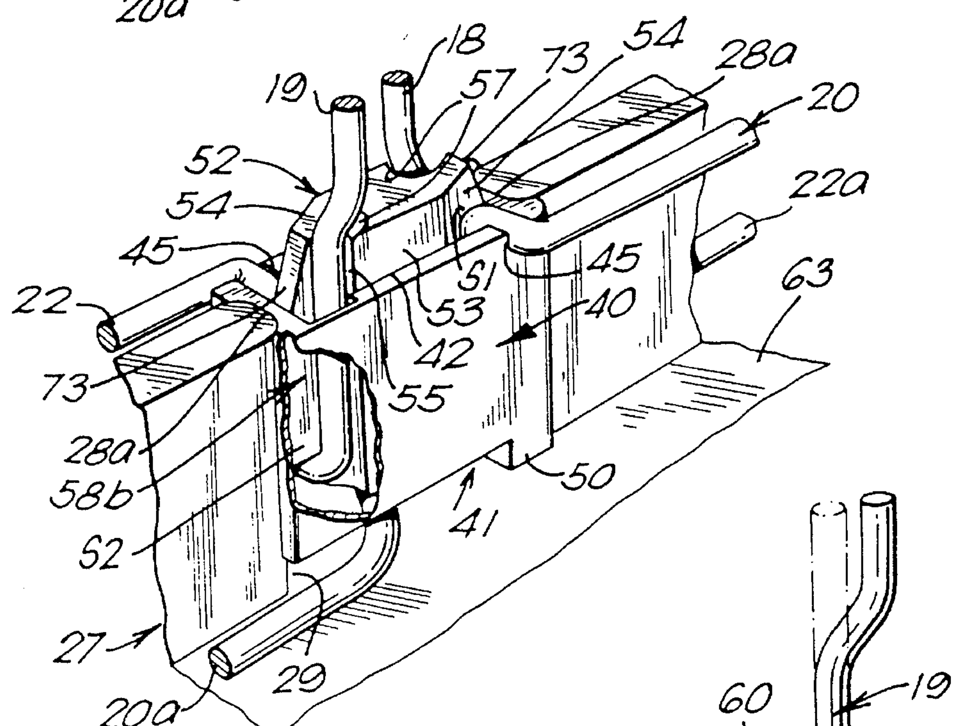
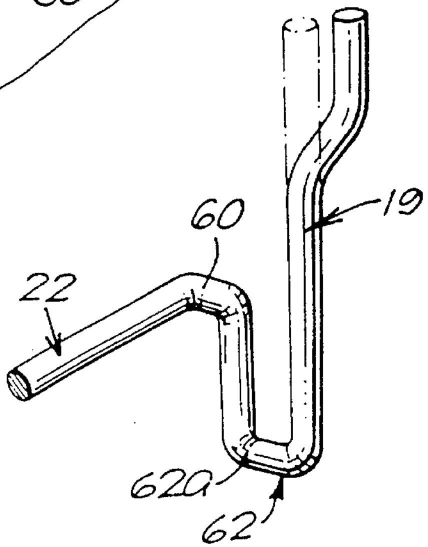
FIG.6

40
45
46
49
47
47
48
48
49
46
45

45
42
49
50
44
43

50
50
43
44

74
72

64
16a
63
69
69
68
65
18
19
70
16
67
66

WINDING END RESTRAINER FOR A ROTARY ELECTRICAL COMPONENT

The invention relates to a winding end restrainer for a rotary electrical component for example a rotor of a brushless generator.

The invention is primarily concerned with a winding end restrainer of a two pole aircraft electric generator of the kind which is designed to run at 24,000 rpm (to provide 400 Hz). Such a generator is described in our U.S. Pat. No. 4,139,789. Reference is also made to FIGS. 1 to 4 of the accompanying drawings in which:

FIG. 1 shows a cross section through a brushless generator of known kind,

FIG. 2 is a perspective view of a rotor of the generator shown in FIG. 1, FIG. 3 is a perspective view of a winding support used at each end of the rotor and, FIG. 4 is a perspective view drawn to a larger scale of part of a winding support of the kind shown in FIG. 3 having a winding end restrainer arranged within a recess in the winding support at one end of the rotor.

Figure 7:
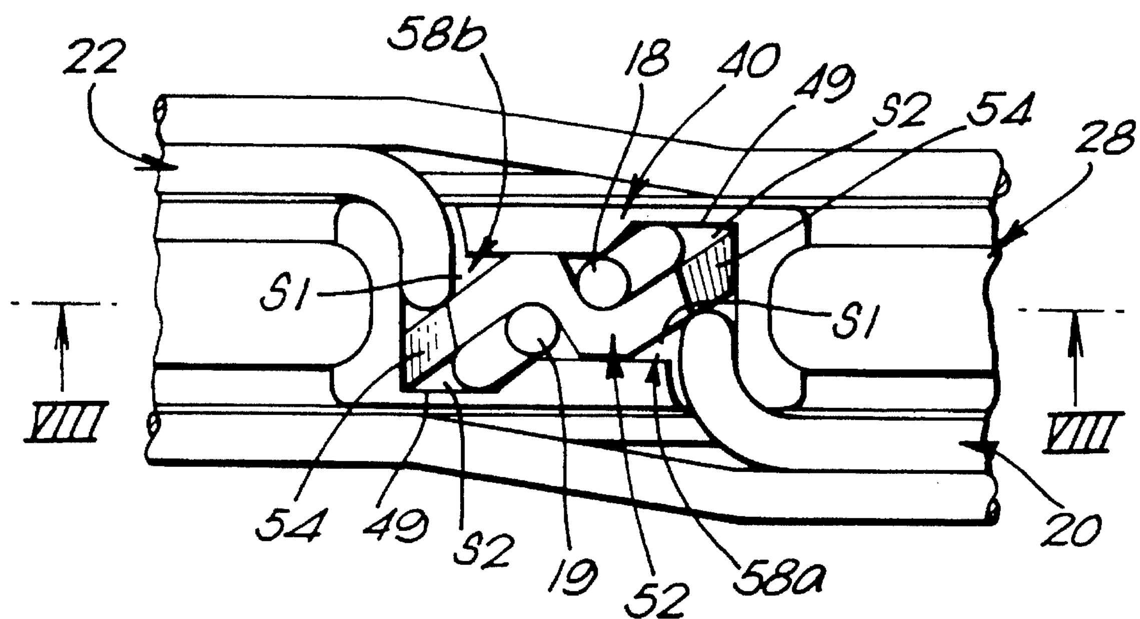

In FIG. 1, a permanent magnet generator 10 supplies current to the stator 12 of an exciter generator 14. Alternating current induced in a rotor 15 of the exciter generator 14 is supplied to a rectifier arrangement 16. The rectifier 16 has positive and negative terminals which supply current to positive and negative ends 18, 19 of two windings 20, 22 of a rotor 23. The windings are arranged in series with their other ends connected together. Main generator output power is derived from a stator 24 having windings which cooperate with the rotating magnetic field provided by the rotor 23.

The rotor 23 is shown in detail in FIG. 2. The rotor includes a core 21 which is of generally I-shaped cross section which provides two salient poles around which,the windings 20, 22 are wound. Such an arrangement is shown, for example, in U.S. Pat. No. 4,603,274 where it can be seen that the windings are positioned within slots of the core. The two windings are separated by flanges on diametrically opposed wedges which extend axially of the rotor and locate in the slots. Such a wedge is indicated at 26 in FIGS. 1 and 2. A winding support of a kind shown in FIG. 3 is provided at each end of the core 21 to guide the windings 20, 22 across the ends of the core to support the windings against distortion and movement due to centrifugal force. The winding support 27 has a diametral web 28 formed with a central recess 29. The web 28 forms a substantial continuation of the flange of each wedge 26.

The winding support 27 at the rectifier end of the core is associated with a winding end restrainer 30 which is positioned within the recess 29 as shown in FIG. 4.

The winding end restrainer 30 is a moulding of suitable insulating material and comprises a central plate 32 having side cheeks 33 (only one of which can be seen in FIG. 4). The side cheeks 33 extend beneath the lower edge of the plate 32 as viewed in the drawing to define notches 34. The positive and negative coil ends 18, 19 of the windings 20, 22 can be seen in FIG. 4. A section of winding end 18 passes alongside cheek 33, beneath the plate 30 via notch 34 and is then bent upwardly so as to extend along the juncture between the unseen cheek 33 and plate 32. The free end 19 of winding 22 extends around the coil end restrainer 30 in a similar manner. The completed core assembly is housed within a shrink-fit sleeve 35 from which remaining components of the rotor are supported to form a rotatable one piece unit. The other ends of windings 20, 22 indicated at 20$a$, 22$a$ are joined together, eg by brazing and are inserted into an elongate opening 31 in the restrainer 30.

During rotation of the rotor 23, high centrifugal forces are generated and there is a tendency for the windings 20, 22 to move radially outwardly thereby tending to twist the winding end retainer 30 out of the plane of the web 28, the direction of twist being shown by the curved arrow in FIG. 4. Such movement stresses the portions of the windings 20, 22 which pass around the winding end restrainer 30 and an object of the invention is to provide a winding end restrainer which will be resistant to twisting movement created by centrifugal force.

According to one aspect of the invention there is provided a winding end restrainer for a rotary electrical component comprising a hollow body, location means for locating the body against rotation relative to the component and an insert locatable in the body so as to be non-rotatable relative thereto, a chamber being defined between the insert and the body for receiving a section of the winding end.

By providing the hollow body which is restrained against rotation relative to the component, it will be resistant to twisting due to centrifugal force and is, therefore, advantageous over the previously known arrangement. Preferably, the winding end restrainer is installed on a rotary electrical component in the form of a rotor of an electric generator.

According to a second aspect of the invention there is provided an electric generator which includes a rotor supporting a winding, the rotor including a winding end restrainer comprising a hollow body, location means for locating the body against rotation relative to the rotor and an insert located in the body so as to be non-rotatable relative thereto, a chamber being defined between the insert and the body in which is located a section of the winding end.

Various preferred features of the winding end restrainer set out in either of the aforesaid aspects of the invention are now set forth.

Preferably, two chambers are defined between the insert and the hollow body for receiving end sections of two separate windings.

The hollow body is preferably arranged to be located with respect to a member such as a winding support arranged at one axial end of the rotary component. Preferably, the hollow body is located in a recess in a web of the member which separates two said windings.

The location means is preferably provided on the hollow body. Where the hollow body is positioned in the aforesaid recess, the location means may comprise respective grooves in the hollow body which may receive respective sections of the web between which the recess is defined.

The hollow body is preferably a generally rectangular tube which has a closure at one end and which is open at its other end to receive the insert.

The tube may have two diagonally opposed notches which form an entry point for respective chambers defined by the winding end restrainer and which preferably receive inwardly bent sections of the windings passing along opposite sides of the aforesaid web of the winding support. The inwardly bent sections are preferably bent towards the centre of the tube.

Each chamber may define a section extending axially of the rotor terminating adjacent a notch in the insert. Each winding end section may be pre-formed so as to locate in the notch and pass beneath a section of the insert. Each chamber preferably defines a further chamber section preferably parallel with the first said chamber section along which a portion of the winding end section can pass so as to extend out of the chamber for connection, e.g., to terminal of a rectifier rotatable with the rotor.

The hollow body is preferably formed with grooving which serves to define at least part of each said chamber. Likewise, the insert may also be formed so as to define grooving which may lie opposite the grooving formed in the hollow body whereby opposed groovings define sections of the chambers.

Chamber sections may additionally, or alternatively, be formed between non-grooved portions of the hollow body and/or inserts.

The insert is preferably a close sliding fit within the hollow body.

The hollow body may be provided with one or more feet at its closure end which serve to space the closure end of the hollow body from an adjacent surface.

The closure is preferably formed with an opening which can receive ends of the windings which are to be joined together to connect the windings in series.

Preferably, the opening in the closure is aligned with an elongate opening or bore in the insert whereby the winding-ends to be joined together can locate within the bore of the insert in electrical contact. Preferably, the elongate opening of the insert is arranged to be coaxial with the axis of rotation of the rotor.

The spacing of the closure from the said adjacent surface permits sections of the windings which terminate at the ends to be joined together to enter the opening in the closure by passing between the closure and the adjacent said surface. The said surface will normally be a surface section of the winding support from which the web projects.

When assembled into the rotary electrical component a retaining member may be positioned between the winding end restrainer and an adjacent surface of the rotary electrical component to effect an axial retention of the winding end restrainer relative to the rotary electrical component. Preferably, the retaining member abuts a surface of the insert. The retaining member may be tubular so as to receive ends of the windings extending from the winding end restrainer. The retaining member may comprise an insulation member.

Figure 8:
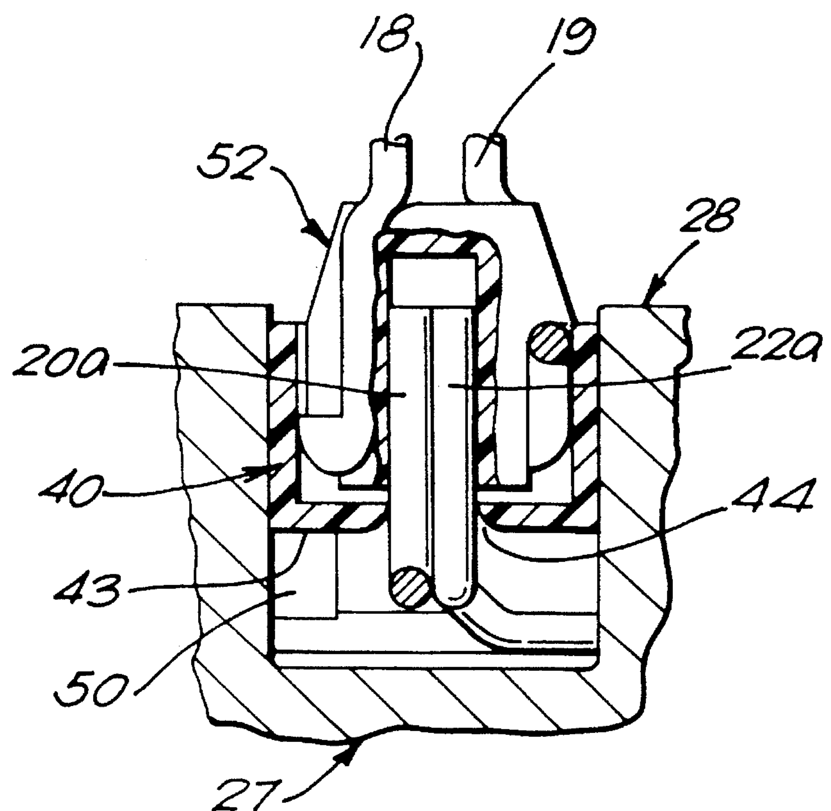
Figure 9:
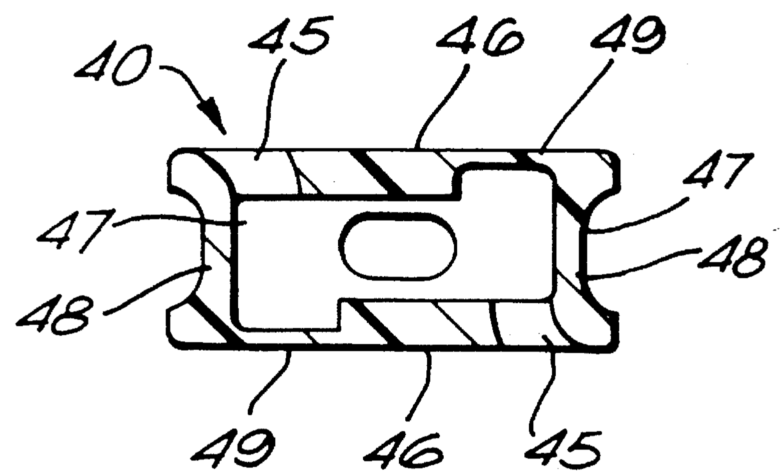
Figure 10:
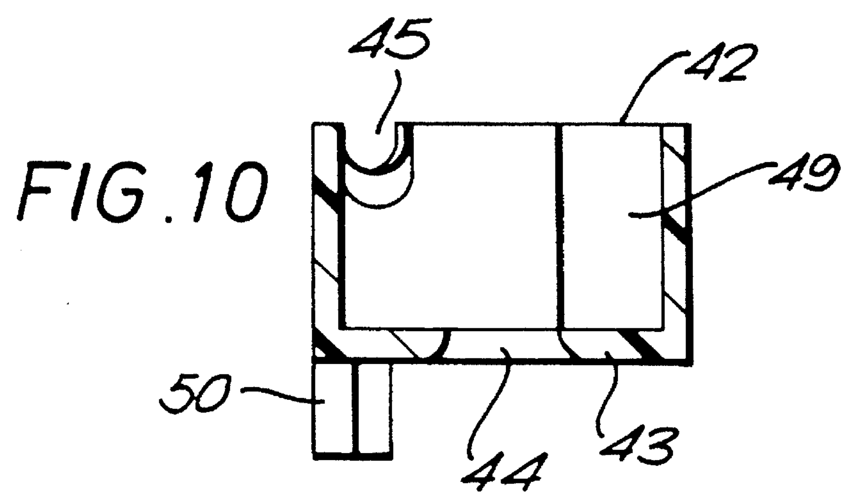
Figure 11:
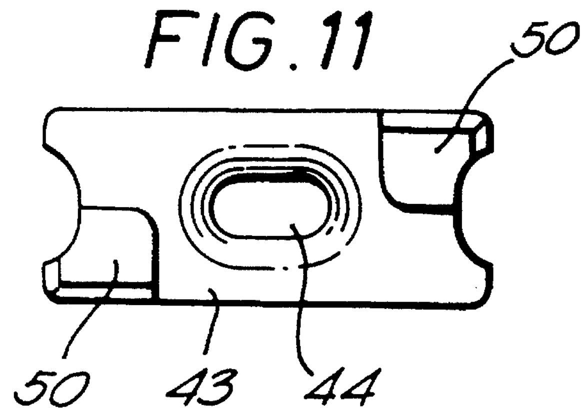
Figure 12:
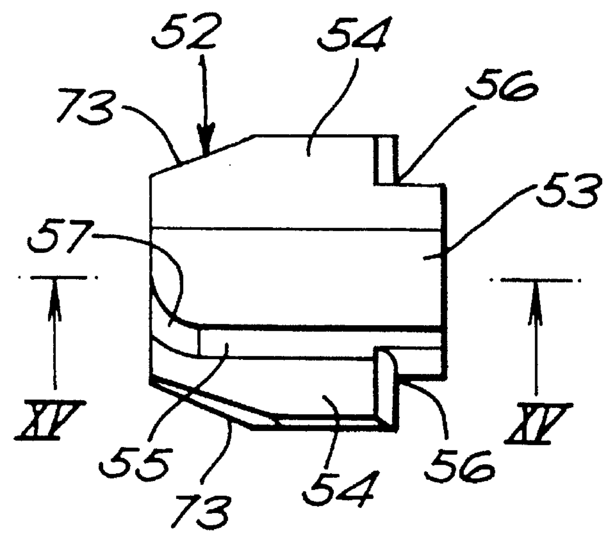
Figure 13:
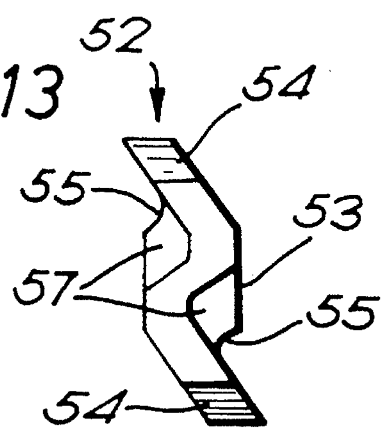
Figure 14:
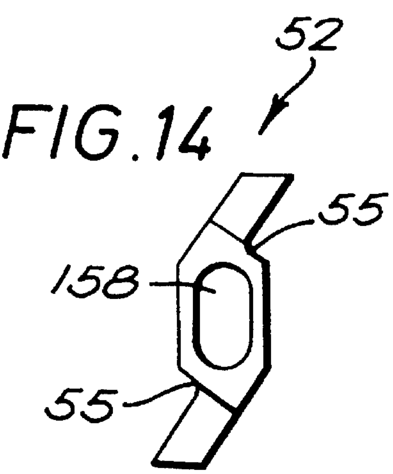
Figure 15:
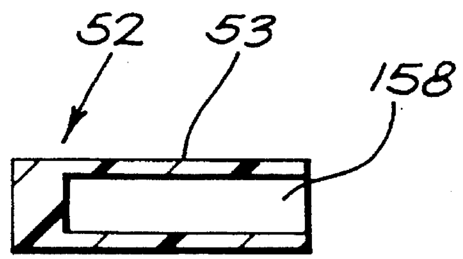
Figure 16:
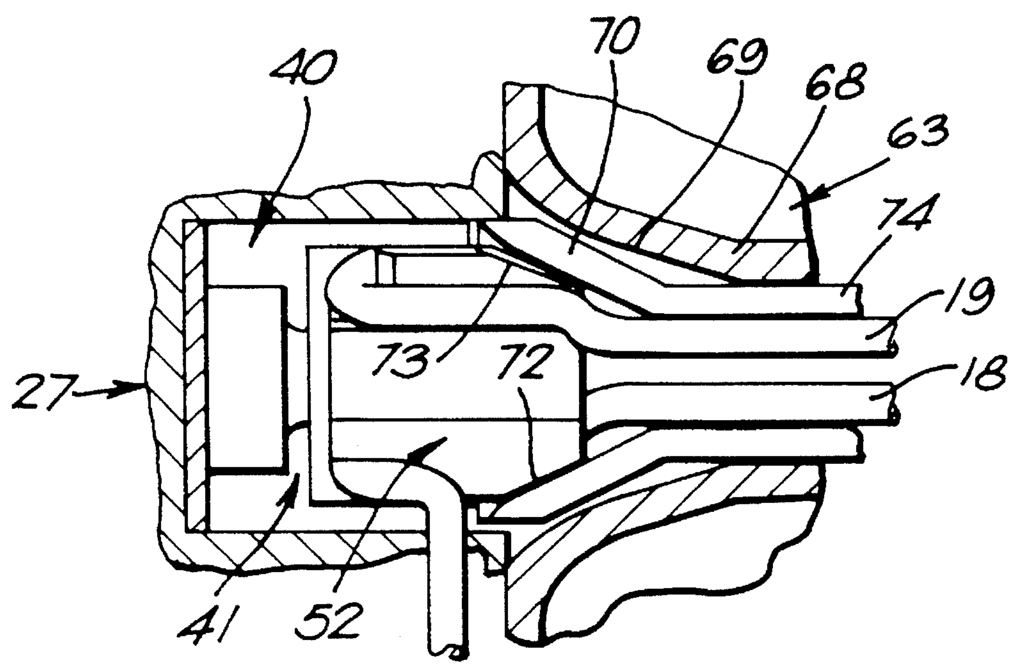
Figure 17:
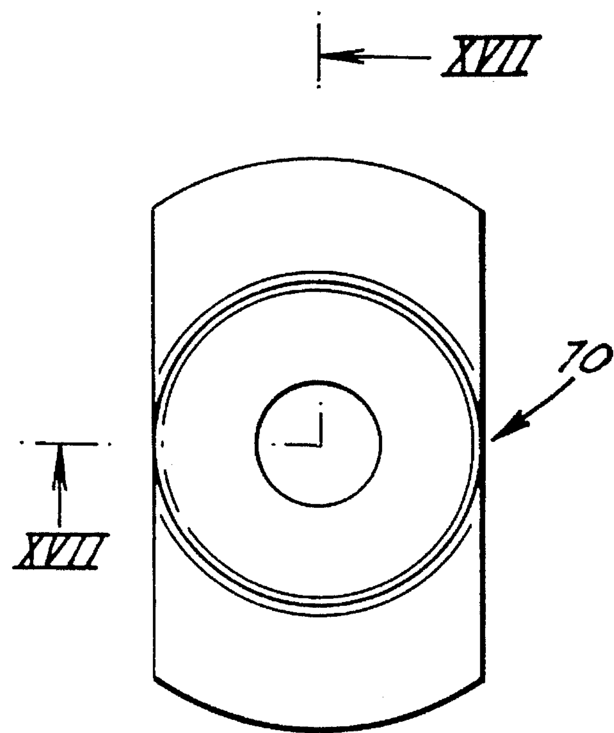
Figure 18:
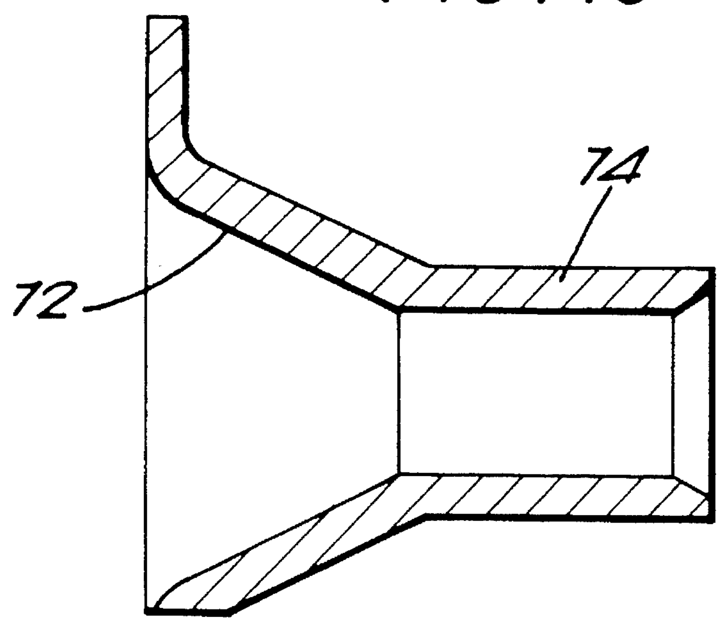
Figure 19:
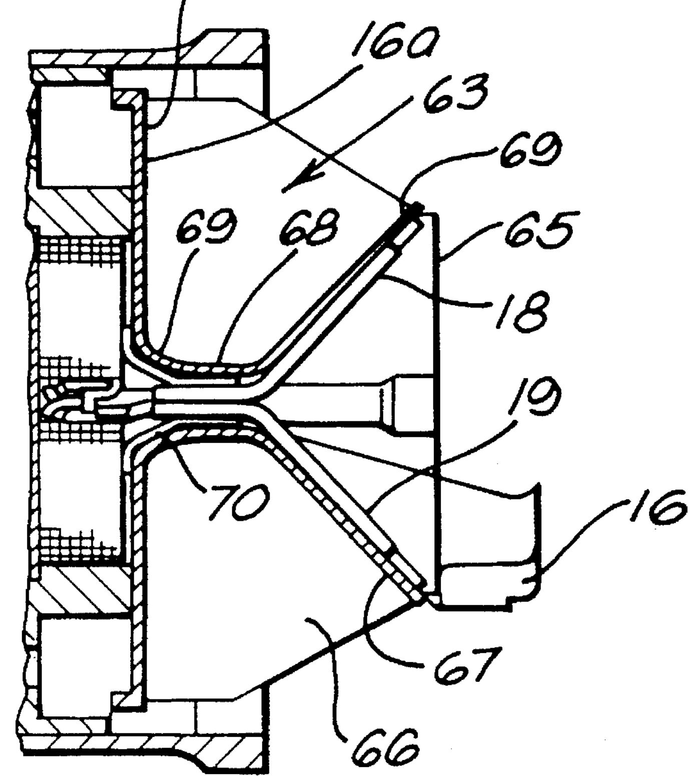

A winding end restrainer in accordance with the invention will now be described by way of example with reference to the remaining accompanying drawings in which:

FIG. 5 is a perspective view of a winding end restrainer in accordance with the invention in position on a winding support, FIG. 6 shows the way in which an end section of a winding is pre-formed to locate within the winding end restrainer, FIG. 7 is a plan view of the winding end restrainer shown in FIG. 5, FIG. 8 is a cross section through the arrangement shown in FIG. 7 on line VIII—VIII in FIG. 7, FIGS. 9, 10 and 11 are plan, cross sectional elevation and underplan views of the hollow body, FIGS. 12, 13 and 14 are side elevation, plan and underplan views of the inserts, FIG. 15 is a cross section of the insert shown in FIG. 12 on the line XV—XV in FIG. 12, FIG. 16 is a view illustrating the way in which the winding end restrainer is positioned relative to a rectifier support, FIG. 17 is an end view of an insulation bush to be positioned between the winding end restrainer and the rectifier support, FIG. 18 is a cross section through the bush shown in FIG. 17 on the line XVIII—XVIII in FIG. 17 and FIG. 19 is a cross section through part of the rotor showing the rectifier support and the final positioning of the positive and negative winding ends-for connection to the rectifier.

In the following description, parts corresponding to parts shown in FIGS. 1 to 4 carry the same reference numerals.

In FIGS. 5 and 7 to 11, it can be seen that a hollow body 40 of a winding end restrainer 41 is of generally rectangular shape in plan view having an open upper end 42 as viewed in FIG. 5 and a lower end defined by a closure 43 having therein an opening 44. The open end 42 (which is the end of the rotor nearest to the rectifier 16 when viewed in FIG. 1) has diagonally opposed notches 45 in opposite side walls 46 and has location grooves 47 formed in edges 48. The side walls 46 are formed with respective internal groovings 49 which extend to the closure 43. Two diagonally opposed legs 50 extend from the closure 43.

As will be apparent from FIG. 5 and 7, edges **28*a* of the web 28 which define the opening or recess 29 locate in the grooves 47 of the hollow body 40 so that the hollow body is unable to twist relative to the web 28**.

The hollow body 40 receives an insert 52 shown in detail in FIGS. 12 to 15. The insert comprises a central section 53 having parallel inclined wings 54 extending therefrom making the insert generally S-shaped in underplan view (FIG. 14). The insert is formed with grooving 55 on opposite sides of the central section 53. One end of the central section 53 extends beyond the wings 54 so as to define notches 56. The respective grooving 55 terminates at inwardly curved grooves 57. The insert is formed with a bore 158 which is open at its right-hand end as viewed in FIG. 15.

The insert 52 is a close sliding fit within the hollow body 40 such that the outer edges of the wings 54 locate in diagonally opposite corners of the hollow body 40 adjacent the respective groovings 49.

The hollow body 40 and insert 52 are moulded from electrically insulating material.

In order to locate end sections 18, 19 of the windings 20, 22, sections of the completed windings are initially pre-formed so that they will fit within the hollow body 40 and will follow the shape of respective chambers **58*a*, 58*b* defined between the hollow body 40 and the insert 52. In that respect, reference is made to FIG. 6 which shows the way in which part of the end section 19 of the windings 22 is pre-formed to locate in the chamber 58*b*. The end section is bent initially inwardly to form a short transverse section 60 which locates in one of the notches 45. The wire is then bent downwardly, transversely, and then upwardly as viewed in FIG. 6 to form a U-shaped section 62 with the transverse lower end 62*a* of the U-shaped section being parallel with the transverse section 60. The right-hand leg of the U-shaped section 62 is longer than the left-hand leg and is of sufficient length to enable it to pass through a rectifier support 63 (FIG. 19) for connection to the rectifier 16. Both end sections of the windings 20, 22 are bent in an identical manner and are initially placed within the hollow body 40 as shown in FIGS. 5, 7 and 8. The insert 52 is then pushed into position in the body so that the pre-formed sections of the windings are trapped between the insert and the hollow body. Each of the chambers 58*a*, 58*b* comprises a section S1 defined between one wing 54 of the insert and an adjacent internal surface of the hollow body, the notch 56 and a further section S2 formed by the space defined between groovings 49, 55. In that way, the pre-formed sections of the winding fit closely within the chambers passing beneath the associated wings 54 via notches 56. Once the insert 52 has been located, the end sections of the wire are bent towards each other so that portions thereof lie within the grooves 57. Preferably, the insert 52 is held in position in the hollow body 40** by a suitable adhesive.

The other free ends of the windings 20, 22 are joined together to connect the windings in series. The other ends of the windings (indicated at 20*a*, 22*a*) are stripped of insulation and joined together by brazing and trimming to length before being introduced through the opening 44 in the hollow body 40 and into the bore 158 of the insert 52. The sections of the windings within the bore 158 are held firmly in position. The axis of the bore 158 when the insert 52 is assembled in the hollow body 40, is coaxial with the axis of rotation of the rotor 23. The end sections 20*a*, 22*a* pass beneath the closure 43 which is spaced from an adjacent surface 63 of the winding support 27 by means of the legs 50. The arrangement can be seen in FIG. 8.

Referring now to FIGS. 16 to 19, the rectifier support 16*a* comprises a front surface 64 and a rear surface 65, the latter suitably supporting the rectifier 16. The rectifier support 16*a* has a series of fins 66 extending between the front and rear surfaces 64, 65 and has a central tubular section 68 having a frusto conical opening 69. The tubular section 68 terminates at divergent walls 67.

With the winding end restrainer 41 completed as shown in FIG. 5, an insulation bush 70 is positioned coaxially of the rotor so that a frusto conical surface 72 thereof firmly engages inclined edges 73 of the insert wings 54 thereby retaining the insert 52 in the hollow body 40. The bush 70 includes a cylindrical section 74 which locates within the tubular section 68 of the rectifier support 16*a*. The winding end sections 18, 19 pass through the cylindrical section 74 and are bent outwardly and secured to the divergent walls 69 of the rectifier support. The end sections 18, 19 are suitably connected to the rectifier 16. The bush 70 fits firmly within the rectifier support 16*a* and holds the winding end restrainer 41 firmly in position in the recess 29 when the rectifier support 16*a* is suitably secured to the rotor 23 by screws (not shown).

The winding end restrainer 41 in accordance with the invention holds end sections of the windings firmly near the axis of rotation of the rotor 23 and prevents unwanted stress being applied to the end sections of the windings which can result when a restrainer is permitted to twist.

Where force is applied to winding wire on either side of the winding end restrainer 41, it is not transmitted to the other side due to the tortuous path that the winding ends take through the chambers 58*a*, 58*b* of the restrainer. Moreover, any force applied to the insert 52 due to centrifugal force on the wire serves to increase jamming effect of the insert 52 within the hollow body 40 and increase firm retention of the winding end sections. The insert 52 is a snug fit within the hollow body 40 at all speed and temperature conditions. Moreover, the support given to the winding end sections by the diagonally opposed notches 45 in the hollow body 40 help to prevent the end sections failing down the sides of the web 28 as can occur in the FIG. 4 arrangement.

I claim:

1. A winding end restrainer for a rotary electrical component comprising a hollow body, location means for locating the body against rotation relative to the component and an insert locatable in the body so as to be non-rotatable relative thereto, a chamber being defined between the insert and the body for receiving a section of the winding end.

2. A winding end restrainer according to claim 1 in which two chambers are defined between the insert and the hollow body for receiving end sections of two separate windings.

3. A winding end restrainer according to claim 1 in which the hollow body is located in use with respect to a member arranged at one axial end of the rotary electrical component.

4. A winding end restrainer according to claim 3 in which the member is formed with a web which is arranged to separate the two windings, the web defining a recess and the hollow body being located in the recess.

5. A winding end restrainer according to claim 4 in which the location means comprises respective grooves in the hollow body.

6. A winding end restrainer according to claim 5 in which the respective grooves receive respective sections of the web between which the recess is defined.

7. A winding end restrainer according to claim 1 in which in the hollow body is a generally rectangular tube which has a closure at one end and which is open at its other end to receive the insert.

8. A winding end restrainer according to claim 7 in which two chambers are defined between the insert and the hollow body for receiving end sections of two separate windings, the hollow body having two diagonally opposed notches which form entry points for respective said chambers defined by the winding end restrainer.

9. A winding end restrainer according to claim 8 in which each chamber defines a section extending in use axially of the rotary electrical component and terminating adjacent a notch in the insert, said section being arranged so as to receive portions of respective end sections of the two separate windings.

10. A winding end restrainer according to claim 9 in which each chamber defines a further chamber section extending axially of the rotary electrical component and terminating adjacent said notch in the insert, said further sections being arranged to receive further portions of the respective end sections of the windings which then extend out of the chamber sections.

11. A winding end restrainer according to claim 1 in which the insert is a snug fit within the hollow body.

12. A winding end restrainer according to claim 1 in which the hollow body has a closure end and an open end, the closure end being provided with one or more feet which serve to space the closure end of the hollow body from an adjacent surface.

13. A winding end restrainer according to claim 12 in which the closure end is formed with an opening which can receive ends of two separate windings which are to be joined together to connect the windings in series.

14. A winding end restrainer according to claim 13 in which the opening in the closure end is aligned with an elongate opening the insert whereby the winding ends to be joined together can locate within the bore of the insert in electrical contact with each other.

15. A winding end restrainer according to claim 14 in which the elongate opening in the insert is, in use, coaxial with an axis of rotation of the rotary electrical component.

16. A winding end restrainer according to claim 1 assembled on to the rotary electrical component, a retaining member being positioned between the winding end restrainer and an adjacent surface of the rotary electrical component to effect an axial retention of the winding end restrainer relative to the rotary electrical component.

17. A winding end restrainer according to claim 16 in which the retaining member abuts a surface of the insert.

18. A winding end restrainer according to claim 16 in which the retaining member is tubular so as to receive ends of the windings extending from the winding end restrainer.

19. A winding end restrainer according to claim 16 in which the retaining member is an insulation member.

20. An electric generator which includes a rotor supporting a winding, the rotor including a winding end restrainer comprising a hollow body, location means for locating the body against rotation relative to the rotor and an insert located in the body so as to be non-rotatable relative thereto, a chamber being defined between the insert and the body in which is located a section of a winding end to be restrained.

* * * * *